(12) United States Patent
Yoshida

(10) Patent No.: US 8,199,362 B2
(45) Date of Patent: Jun. 12, 2012

(54) COLOR CONVERSION TABLE CREATING DEVICE

(75) Inventor: Yasunari Yoshida, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 546 days.

(21) Appl. No.: 12/490,745

(22) Filed: Jun. 24, 2009

(65) Prior Publication Data

US 2009/0323122 A1    Dec. 31, 2009

(30) Foreign Application Priority Data

Jun. 30, 2008  (JP) ................................ 2008-169963

(51) Int. Cl.
    *G06F 15/00* (2006.01)
(52) U.S. Cl. ........................................ 358/1.9; 358/3.23
(58) Field of Classification Search ................. 358/1.19, 358/3.23
    See application file for complete search history.

(56) References Cited

U.S. PATENT DOCUMENTS

| | | | |
|---|---|---|---|
| 6,014,457 A | 1/2000 | Kubo et al. | |
| 7,071,955 B2 | 7/2006 | Miyachi et al. | |
| 7,460,283 B2 * | 12/2008 | Saito | 358/515 |
| 2002/0048031 A1 | 4/2002 | Suwa et al. | |
| 2003/0072016 A1 | 4/2003 | Dalrymple et al. | |
| 2004/0141642 A1 | 7/2004 | Zeng et al. | |
| 2004/0227977 A1 * | 11/2004 | Yoshida | 358/3.01 |
| 2005/0190390 A1 | 9/2005 | Yamada et al. | |

FOREIGN PATENT DOCUMENTS

| | | |
|---|---|---|
| JP | 10-145626 | 5/1998 |
| JP | 2002-064723 A | 2/2002 |
| JP | 2002-335413 A | 11/2002 |
| JP | 2004-007509 A | 1/2004 |
| JP | 2004-229277 A | 8/2004 |
| JP | 2005-134866 | 5/2005 |
| JP | 2005-244879 | 9/2005 |

OTHER PUBLICATIONS

Japanese Official Action dated Sep. 14, 2010 together with a partial English language translation.

* cited by examiner

*Primary Examiner* — Twyler Haskins
*Assistant Examiner* — Helen Q Zong
(74) *Attorney, Agent, or Firm* — Scully, Scott, Murphy & Presser, P.C.

(57) ABSTRACT

A color conversion table creating device includes a gray data creating unit, light and dark area data creating unit, first grid point correspondence relationship determining unit, second grid point correspondence relationship determining unit including gray-dark auxiliary line setting unit, intersecting point setting and signal determining units, interpolation coefficient determining unit, and second grid point interpolation unit, and color conversion table creating unit. The device sets a gray-dark auxiliary line gray and dark intersecting points, The device determines, based on gray data and dark area data, output color signals corresponding to the gray-dark auxiliary line gray and dark intersecting points determines light interpolation coefficient reflecting characteristic of light area data, and determines a relationship for the second grid point between an input color signal and an output color signal by performing interpolation between the output color signals corresponding to the gray-dark auxiliary line gray and dark intersecting points by using the light interpolation coefficient.

14 Claims, 9 Drawing Sheets

FIG.2

COLOR CONVERSION TABLE

| RGB COLOR SPACE | | | CMYK COLOR SPACE | | | |
|---|---|---|---|---|---|---|
| R | G | B | C | M | Y | K |
| * | * | * | * | * | * | * |
| * | * | * | * | * | * | * |
| * | * | * | * | * | * | * |

COLOR CONVERSION TABLE CREATING DEVICE

CROSS REFERENCE TO RELATED APPLICATION

This application claims priority from Japanese Patent Application No. 2008-169963 filed Jun. 30, 2008. The entire content of this priority application is incorporated herein by reference.

TECHNICAL FIELD

The present invention relates to a color conversion table creating device, a method, and a computer-readable recording medium that stores a color conversion table creating program.

BACKGROUND

Methods for matching colors on a first device, such as a monitor that uses the RGB color space to render colors, and a second device, such as a printer that uses the CMYK color space to render colors, are well known in the art. In the method, for example, first a color conversion table describing correlations between parameters in the RGB color space (RGB values) and parameters in the CMYK color space (CMYK values) is prepared, then convert data in the RGB color space to data in the CMYK color space by using this color conversion table.

Specifically, a personal computer (hereinafter abbreviated as "PC") issues a command to a printer to print a test patch image on recording papers. The test patch image includes a plurality of test patches, each of a different color. A patch number is assigned to each test patch. The CMYK test data used for outputting the test patches is also stored on the PC for determining correlations between each test patch and CMYK values used for outputting the test patch. Next, the PC measures colorimetric values of test patches in the test patch image and creates data indicating correlations between RGB values and CMYK values based on the measured values for each test patch and the CMYK values of the test data.

The PC processes a conical space as shown in FIG. 8(a). In FIG. 8(a), red (R), magenta (M), blue (B), cyan (C), green (G), and yellow (Y) have been set as the primary colors in the conical space. First, the PC performs a process on the hue of one primary color extracted from the conical space as shown in FIG. 8(b) (the color blue in the example shown in FIG. 8(b)), and uses the measured colorimetric values from the test patches to find correlations between RGB values and CMYK values at various points along an achromatic axis 100 between points P3 (white) and P0 (black), a side 102 between points P0 and P7 (blue), and a side 104 between points P7 and P3. After finding RGB values and CMYK values at points along these lines, the PC next performs linear interpolation to calculate correlation data between RGB and CMYK values for points in the color gamut defined by the achromatic axis 100 and sides 102 and 104.

As shown in FIG. 8(b), the PC finds a cyan value Cx for a point X in the color gamut according to the following Equations (1)-(3) using cyan values corresponding to points R, S, P, and Q for which correlations are known.

$$C_X1 = C_P + (C_Q - C_P)*a/b \quad (1)$$

$$C_X2 = C_R + (C_S - C_R)*c/d \quad (2)$$

$$C_X = (C_X1 + C_X2)/2 \quad (3)$$

Here, "$C_P$" is the cyan value for point P, "$C_Q$" the cyan value for point Q, "$C_R$" the cyan value for point R, and "$C_S$" the cyan value for point S. Further, "a" is the length of the line segment PX, "b" the length of the line segment PQ, "c" the length of the line segment RX, and "d" the length of the line segment RS.

Values for each primary color magenta, yellow, and black can similarly be found for a grid point X. By calculating values corresponding to each of the CMYK colors for grid points in the color gamut, correlations between RGB and CMYK values can be found for the entire selected color gamut (blue in this example).

SUMMARY

However, irregularities in gradation expression often occur when correlations at grid points within the color gamut are found through linear interpolation. FIG. 9(a) is a graph showing experimental results for finding the relationship between changes in color from white to black and the amount of ink required for rendering the color in CMY values, where the horizontal axis represents changes in color from white to black along the achromatic axis, and the vertical axis represents the amount of ink for the colors CMY. As shown in FIG. 9(a), a larger amount of ink is used for rendering colors nearer to black, but the amount of ink for each of the CMY colors increases along a curve, i.e., nonlinearly. Hence, changes in color along the achromatic axis are not proportional to changes in the quantity of ink.

Similarly, FIG. 9(b) is a graph showing experimental results for finding the relationship between changes in color from white to the primary color red (R) and the amount of ink required for rendering the color in CMY values, where the horizontal axis represents changes in color from white to the primary color red, and the vertical axis represents the amount of ink for the colors CMY. As shown in FIG. 9(b), the amounts of magenta and yellow ink for rendering red increase toward the primary color, but the relationship between changes in color and ink quantity is still nonlinear.

Similarly, FIG. 9(c) is a graph showing experimental results for finding the relationship between changes in color from white to black and the amount of ink required for rendering the color in the four CMYK values. Further, FIG. 9(d) is a graph showing experimental results for finding the relationship between changes in color from white to the primary color blue (B) and the amount of ink required for rendering the color in the four CMYK values. As shown in FIGS. 9(c) and 9(d), the relationship between changes in color and ink quantity is nonlinear, even when black is added to the CMY ink colors.

Therefore, when correlations within the color gamut are found through simple linear interpolation, the curves representing changes in ink quantities are not appropriately reflected, resulting in irregularities in color gradation.

For example, if the curve indicating the quantity of ink corresponding to the color between white and the primary color is convex on the bottom, as shown in FIG. 9(b), calculating corresponding CMYK values through simple linear interpolation will produce a color darker than the intended color. Accordingly, smooth gradations cannot be achieved in that color region.

While it is conceivable that the initial correlations found for RGB values and CMYK values can be partially recalibrated to remove these inconsistencies, such a method would increase the number of steps required for creating the color conversion table, leading to the separate problem of a lengthier processing time.

In view of the foregoing, it is an object of the invention to provide a color conversion table creating device capable of creating a color conversion table that provides superior tone expression when the color conversion table is used in a color conversion process.

In order to attain the above and other objects, the invention provides a color conversion table creating device. The color conversion table creating device creates a color conversion table indicating correspondence relationships for grid points between input color signals representing values in an input color space defined in an input-side device and output color signals representing values in an output color space defined in an output-side device. A color gamut, primary colors, a gray line, light lines, and dark lines, and the grid points being defined in the input color space. The gray line connects white and black. One light line is defined for each primary color as a line connecting white and the subject primary color. One dark line is defined for each primary color as a line connecting black and the subject primary color. The color gamut includes primary color gamuts. One primary color gamut is defined for each primary color by the gray line, the light line corresponding to the subject primary color, and the dark line corresponding to the subject primary color. The grid points has first grid points and second grid points different from the first grid points. The first grid points and the second grid points are positioned in the primary color gamuts. The first grid points are positioned on at least one of the gray line, light lines, and dark lines. Under the above-explained definitions, the color conversion table creating device includes a gray data creating unit, a light area data creating unit, a dark area data creating unit, a first grid point correspondence relationship determining unit, a second grid point correspondence relationship determining unit, and a color conversion table creating unit. The gray data creating unit creates gray data representing a correspondence relationship between input color signals and output color signals for prescribed points that are positioned on a gray line. The light area data creating unit creates, for each primary color, light area data representing a correspondence relationship between input color signals and output color signals for prescribed points that are positioned on a light line. The dark area data creating unit creates, for each primary color, dark area data representing a correspondence relationship between input color signals and output color signals for prescribed points that are positioned on a dark line. The first grid point correspondence relationship determining unit determines, for each first grid point, first grid point correspondence relationship between an input color signal and an output color signal, based on the gray data, the light area data, and the dark area data. The second grid point correspondence relationship determining unit determines, for each second grid point, a second grid point correspondence relationship between an input color signal and an output color signal. The second grid point correspondence relationship determining unit includes a gray-dark auxiliary line setting unit, an intersecting point setting unit, an intersecting point signal determining unit, an interpolation coefficient determining unit, and a second grid point interpolating unit. The gray-dark auxiliary line setting unit sets, in a primary color gamut in which the each second grid point is positioned, a gray-dark auxiliary line passing through the each second grid point and intersecting with both the gray line and the dark line. The intersecting point setting unit sets a point at intersection of the gray-dark auxiliary line with the gray line as a gray-dark auxiliary line gray intersecting point, and sets a point at intersection of the gray-dark auxiliary line with the dark line as a gray-dark auxiliary line dark intersecting point. The intersecting point signal determining unit determines, based on the gray data and the dark area data, an output color signal corresponding to the gray-dark auxiliary line gray intersecting point and an output color signal corresponding to the gray-dark auxiliary line dark intersecting point. The interpolation coefficient determining unit determines, for the each second grid point, a light interpolation coefficient that reflects characteristic of the light area data.

The second grid point interpolating unit determines, for the each second grid point, a second grid point correspondence relationship between an input color signal and an output color signal by performing interpolation between the output color signals corresponding to the gray-dark auxiliary line gray intersecting point and the gray-dark auxiliary line dark intersecting point by using the light interpolation coefficient. The color conversion table creating unit creates a color conversion table indicating the first grid point correspondence relationships for the first grid points and the second grid point correspondence relationships for the second grid points.

According to another aspect, the present invention provides a color conversion table creating device for creating a color conversion table under the above-explained definitions. The color conversion table creating device includes a gray data creating unit, a light area data creating unit, a dark area data creating unit, a first grid point correspondence relationship determining unit, a second grid point correspondence relationship determining unit, and a color conversion table creating unit. The gray data creating unit creates gray data representing a correspondence relationship between input color signals and output color signals for prescribed points that are positioned on a gray line. The light area data creating unit creates, for each primary color, light area data representing a correspondence relationship between input color signals and output color signals for prescribed points that are positioned on a light line. The dark area data creating unit creates, for each primary color, dark area data representing a correspondence relationship between input color signals and output color signals for prescribed points that are positioned on a dark line. The first grid point correspondence relationship determining unit determines, for each first grid point, first grid point correspondence relationship between an input color signal and an output color signal, based on the gray data, the light area data, and the dark area data. The second grid point correspondence relationship determining unit determines, for each second grid point, a second grid point correspondence relationship between an input color signal and an output color signal. The second grid point correspondence relationship determining unit includes a light-dark auxiliary line setting unit, an intersecting point setting unit, an intersecting point signal determining unit, an interpolation coefficient determining unit, and a second grid point interpolating unit. The light-dark auxiliary line setting unit sets, in a primary color gamut in which the each second grid point is positioned, a light-dark auxiliary line passing through the each second grid point and intersecting with both the light line and the dark line. The intersecting point setting unit sets a point at intersection of the light-dark auxiliary line with the light line as a light-dark auxiliary line light intersecting point, and sets a point at intersection of the light-dark auxiliary line with the dark line as a light-dark auxiliary line dark intersecting point. The intersecting point signal determining unit determines, based on the light data and the dark area data, an output color signal corresponding to the light-dark auxiliary line light intersecting point and an output color signal corresponding to the light-dark auxiliary line dark intersecting point. The interpolation coefficient determining unit determines, for the each second grid point, a gray interpolation coefficient that reflects characteristic of the gray data. The second grid point interpolating unit determines, for the each second grid point, a second grid point correspondence relationship between an input color signal and an output color signal by performing interpolation between the output color signals corresponding to the light-dark auxiliary line light intersecting point and the light-dark auxiliary line dark intersecting point by using the gray interpolation coefficient. The color conversion table creating unit that creates a color conversion table indicating the first grid point correspondence relationships for the first grid points and the second grid point correspondence relationships for the second grid points.

According to another aspect, the present invention provides a method for creating a color conversion table under the above-explained definitions, the method including: creating, with a color conversion table creating device, gray data representing a correspondence relationship between input color signals and output color signals for prescribed points that are positioned on the gray line; creating, for each primary color, light area data representing a correspondence relationship between input color signals and output color signals for prescribed points that are positioned on the light line; creating, for each primary color, dark area data representing a correspondence relationship between input color signals and output color signals for prescribed points that are positioned on the dark line; (a) determining, for each first grid point, first grid point correspondence relationship between an input color signal and an output color signal, based on the gray data, the light area, data, and the dark area data; (b) determining, for each second grid point, a second grid point correspondence relationship between an input color signal and an output color signal, the (b) determining step including: setting, in a primary color gamut in which the each second grid point is positioned, a gray-dark auxiliary line passing through the each second grid point and intersecting with both the gray line and the dark line; setting a point at intersection of the gray-dark auxiliary line with the gray line as a gray-dark auxiliary line gray intersecting point; setting a point at intersection of the gray-dark auxiliary line with the dark line as a gray-dark auxiliary line dark intersecting point; determining, based on the gray data and the dark area data, an output color signal corresponding to the gray-dark auxiliary line gray intersecting point and an output color signal corresponding to the gray-dark auxiliary line dark intersecting point; determining, for the each second grid point, a light interpolation coefficient that reflects characteristic of the light area data; and determining, for the each second grid point, a second grid point correspondence relationship between an input color signal and an output color signal by performing interpolation between the output color signals corresponding to the gray-dark auxiliary line gray intersecting point and the gray-dark auxiliary line dark intersecting point by using the light interpolation coefficient; and creating a color conversion table indicating the first grid point correspondence relationships for the first grid points and the second grid point correspondence relationships for the second grid points.

According to another aspect, the present invention provides a method for creating a color conversion table under the above-explained definitions, the method including: creating gray data representing a correspondence relationship between input color signals and output color signals for prescribed points that are positioned on the gray line; creating, for each primary color, light area data representing a correspondence relationship between input color signals and output color signals for prescribed points that are positioned on the light line; creating, for each primary color, dark area data representing a correspondence relationship between input color signals and output color signals for prescribed points that are positioned on the dark line; (a) determining, for each first grid point, first grid point correspondence relationship between an input color signal and an output color signal, based on the gray data, the light area data, and the dark area data; (b) determining, for each second grid point, a second grid point correspondence relationship between an input color signal and an output color signal, the (b) determining step including: setting, in a primary color gamut in which the each second grid point is positioned, a light-dark auxiliary line passing through the each second grid point and intersecting with both the light line and the dark line; setting a point at intersection of the light-dark auxiliary line with the light line as a light-dark auxiliary line light intersecting point; setting a point at intersection of the light-dark auxiliary line with the dark line as a light-dark auxiliary line dark intersecting point; determining, based on the light data and the dark area data, an output color signal corresponding to the light-dark auxiliary line light intersecting point and an output color signal corresponding to the light-dark auxiliary line dark intersecting point; determining, for the each second grid point, a gray interpolation coefficient that reflects characteristic of the gray data; and determining, for the each second grid point, a second grid point correspondence relationship between an input color signal and an output color signal by performing interpolation between the output color signals corresponding to the light-dark auxiliary line light intersecting point and the light-dark auxiliary line dark intersecting point by using the gray interpolation coefficient; and creating a color conversion table indicating the first grid point correspondence relationships for the first grid points and the second grid point correspondence relationships for the second grid points.

According to another aspect, the present invention provides a computer-readable recording medium that stores a color conversion table creating program for creating a color conversion table under the above-explained definitions. The color conversion table creating program includes instructions for: creating, with a color conversion table creating device, gray data representing a correspondence relationship between input color signals and output color signals for prescribed points that are positioned on the gray line; creating, for each primary color, light area data representing a correspondence relationship between input color signals and output color signals for prescribed points that are positioned on the light line; creating, for each primary color, dark area data representing a correspondence relationship between input color signals and output color signals for prescribed points that are positioned on the dark line; (a) determining, for each first grid point, first grid point correspondence relationship between an input color signal and an output color signal, based on the gray data, the light area data, and the dark area data; (b) determining, for each second grid point, a second grid point correspondence relationship between an input color signal and an output color signal, the (b) determining step including: setting, in a primary color gamut in which the each second grid point is positioned, a gray-dark auxiliary line passing through the each second grid point and intersecting with both the gray line and the dark line; setting a point at intersection of the gray-dark auxiliary line with the gray line as a gray-dark auxiliary line gray intersecting point; setting a point at intersection of the gray-dark auxiliary line with the dark line as a gray-dark auxiliary line dark intersecting point; determining, based on the gray data and the dark area data, an output color signal corresponding to the gray-dark auxiliary line gray intersecting point and an output color signal corresponding to the gray-dark auxiliary line dark intersecting point; determining, for the each second grid point, a light interpolation coefficient that reflects characteristic of the light area data; and determining, for the each second grid point, a second grid point correspondence relationship between an input color signal and an output color signal by performing interpolation between the output color signals corresponding to the gray-dark auxiliary line gray intersecting point and the gray-dark auxiliary line dark intersecting point by using the light interpolation coefficient; and creating a color conversion table indicating the first grid point correspondence relationships for the first grid points and the second grid point correspondence relationships for the second grid points.

According to another aspect, the present invention provides a computer-readable recording medium that stores a color conversion table creating program for creating a color conversion table under the above-explained definitions. The color conversion table creating program includes instructions for: creating gray data representing a correspondence relationship between input color signals and output color signals for prescribed points that are positioned on the gray line; creating, for each primary color, light area data representing a correspondence relationship between input color signals and output color signals for prescribed points that are positioned on the light line; creating, for each primary color, dark area data representing a correspondence relationship between input color signals and output color signals for prescribed points that are positioned on the dark line; (a) determining, for each first grid point, first grid point correspondence relationship between an input color signal and an output color signal, based on the gray data, the light area data, and the dark area data; (b) determining, for each second grid point, a second grid point correspondence relationship between an input color signal and an output color signal, the (b) determining step including: setting, in a primary color gamut in which the each second grid point is positioned, a light-dark auxiliary line passing through the each second grid point and intersecting with both the light line and the dark line; setting a point at intersection of the light-dark auxiliary line with the light line as a light-dark auxiliary line light intersecting point; setting a point at intersection of the light-dark auxiliary line with the dark line as a light-dark auxiliary line dark intersecting point; determining, based on the light data and the dark area data, an output color signal corresponding to the light-dark auxiliary line light intersecting point and an output color signal corresponding to the light-dark auxiliary line dark intersecting point; determining, for the each second grid point, a gray interpolation coefficient that reflects characteristic of the gray data; and determining, for the each second grid point, a second grid point correspondence relationship between an input color signal and an output color signal by performing interpolation between the output color signals corresponding to the light-dark auxiliary line light intersecting point and the light-dark auxiliary line dark intersecting point by using the gray interpolation coefficient; and creating a color conversion table indicating the first grid point correspondence relationships for the first grid points and the second grid point correspondence relationships for the second grid points.

BRIEF DESCRIPTION OF THE DRAWINGS

The particular features and advantages of the invention as well as other objects will become apparent from the following description taken in connection with the accompanying drawings, in which:

FIG. 2 is an explanatory diagram showing the structure of a color conversion table;

FIG. 8($b$) is an explanatory diagram showing an interpolation process in the prior art;

FIG. 9($b$) is a graph showing experimental results for finding the relationship between changes in color from white to the primary color and the amount of ink required for rendering the color in CMY values;

FIG. 9($c$) is a graph showing experimental results for finding the relationship between changes in color from white to black and the amount of ink required for rendering the color in CMYK values; and FIG. 9($d$) is a graph showing experimental results for finding the relationship between changes in color from white to the primary color and the amount of ink required for rendering the color in CMYK values.

DETAILED DESCRIPTION

A color conversion table creating system according to a first embodiment of the present invention will be described while referring to FIGS. 1-5.

Figure 1:
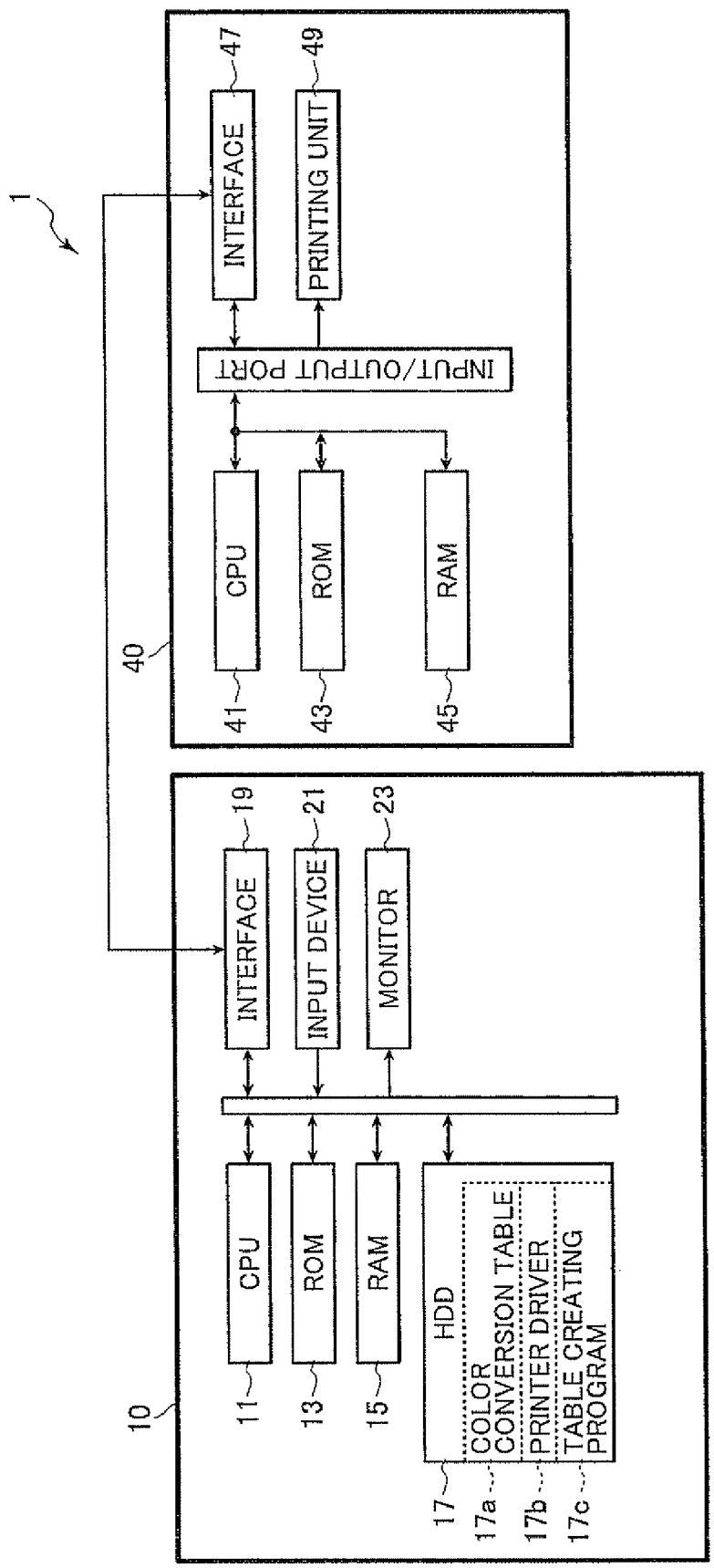
FIG. 1 is a color conversion table creating system including a table creating device according to illustrative aspects of the invention.

As shown in FIG. 1, a table creating system 1 for creating a color conversion table according to the first embodiment includes a personal computer 10 (hereinafter abbreviated as "PC 10") and a printer 40. The printer 40 is an inkjet printer that forms images by ejecting ink droplets in the colors cyan, magenta, yellow, and black onto recording paper based on output color signals expressed in the CMYK color space received from the PC 10. The PC 10 implements a table creating process described later (see FIG. 4) by executing a table creating program 17$c$ described later to find correlations between input color signals expressed in the RGB color space used on a monitor 23 of the PC 10, and output color signals expressed in the CMYK color space used on the printer 40, and to create a color conversion table 17$a$ based on these correlations in order to convert input color signals (RGB) to output color signals (CMYK).

As shown in FIG. 1, the PC 10 includes primarily a CPU 11, a ROM 13, a RAM 15, a hard disk drive 17, an interface 19, an input device 21, and a monitor 23. The all components are connected to each other via a bus line.

The CPU 11 controls each components connected via the bus line, based on various fixed values and various programs that are stored in the ROM 13, RAM 15, and HDD 17. The ROM 13 stores various programs for performing the overall control of the PC 10. The RAM 15 is a rewritable memory that can store temporarily various data. The HDD 17 stores a color conversion table 17$a$, printer driver 17$b$, and table creating program 17$c$.

FIG. 2 shows the structure of the color conversion table 17$a$. The color conversion table 17$a$ provides correlations between each grid point in the RGB color space and each value of the parameters C, M, Y, and K in the CMYK color space (hereinafter referred to as the "CMYK values"). Accordingly, the CPU 11 can convert input color signals expressed as RGB values into output color signals expressed as CMYK values based on the color conversion table 17a.

Figure 3:
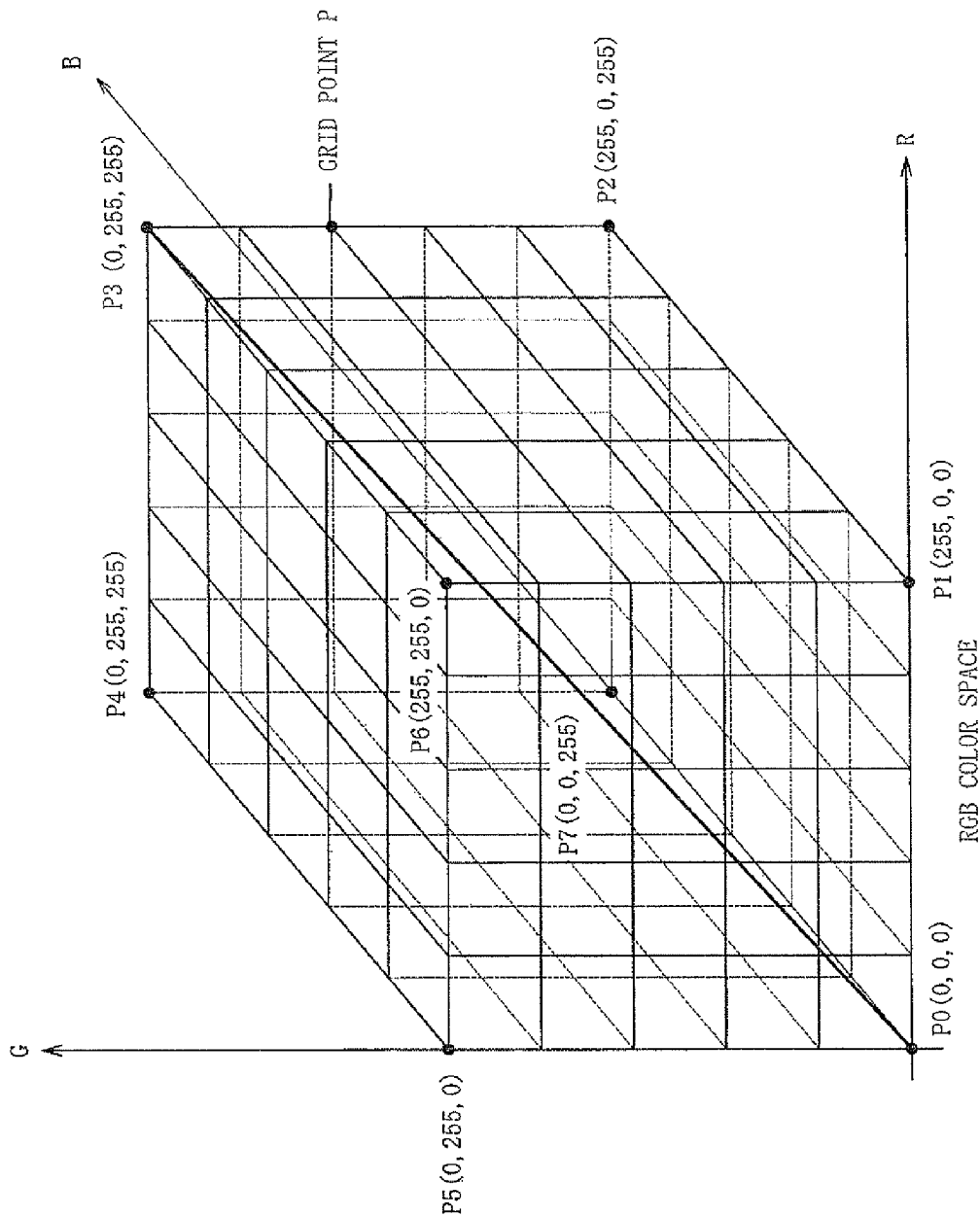
FIG. 3 is a conceptual diagram illustrating the structure of RGB color space.

FIG. 3 is an explanatory diagram showing the structure of the RGB color space. The color conversion table 17a is configured of data expressing correlations between CMYK values and RGB values at each of the grid points P that is defined in the RGB color space shown in FIG. 3. In other words, the color conversion table 17a do not provide the CMYK values corresponding to all possible combinations of the parameters R, G, and B (that is, all colors that can be rendered in the RGB color space), but only the CMYK values corresponding to specific grid points in the RGB color space.

Therefore, in a color conversing and printing process executed on the printer 40, a CPU 41 provided in the printer 40 (described later) calculates output color signals corresponding to input color signals other than grid points P stored in the color conversion table 17a through an interpolation method, such as cubic interpolation, triangular prism interpolation, or tetrahedral interpolation. Since these interpolation techniques are well known in the art, a more detailed description will not be given herein.

Returning to FIG. 1, the PC 10 performs a color conversion process and a process for outputting the output color signals expressed as CMYK values found through the color conversion process, by the executing the printer driver 17b. The PC 10 performs a table creating process described later by executing the table creating program 17c, and creates the color conversion table 17a.

The input device 21 enables a user to input instructions and includes a keyboard, mouse, or the like. The monitor 23 such as a CRT display unit or a liquid crystal display unit displays information about various processes and inputted data.

The printer 40 includes a CPU 41; a ROM 43 storing various control programs that are executed by the CPU 41; a ROM 43; a RAM 45 storing various data and instructions; an interface 47 that can communicate with the PC 10 via the interface 19; and a printing unit 49. The CPU 41, ROM 43, and RAM 45 are connected to each other via a bus line connected to an input/output port.

The printing unit 49 includes a recording head (not shown) having nozzles to eject ink droplets onto the recording paper. The printing unit 49 forms images by ejecting ink droplets in the colors cyan, magenta, yellow, and black onto the recording paper in accordance with instructions received from the CPU 41. The input/output port 59 is connected to the interface 47. The printer 40 is configured to communicate with the PC 10 via the interfaces 47 and 19.

Figure 4:
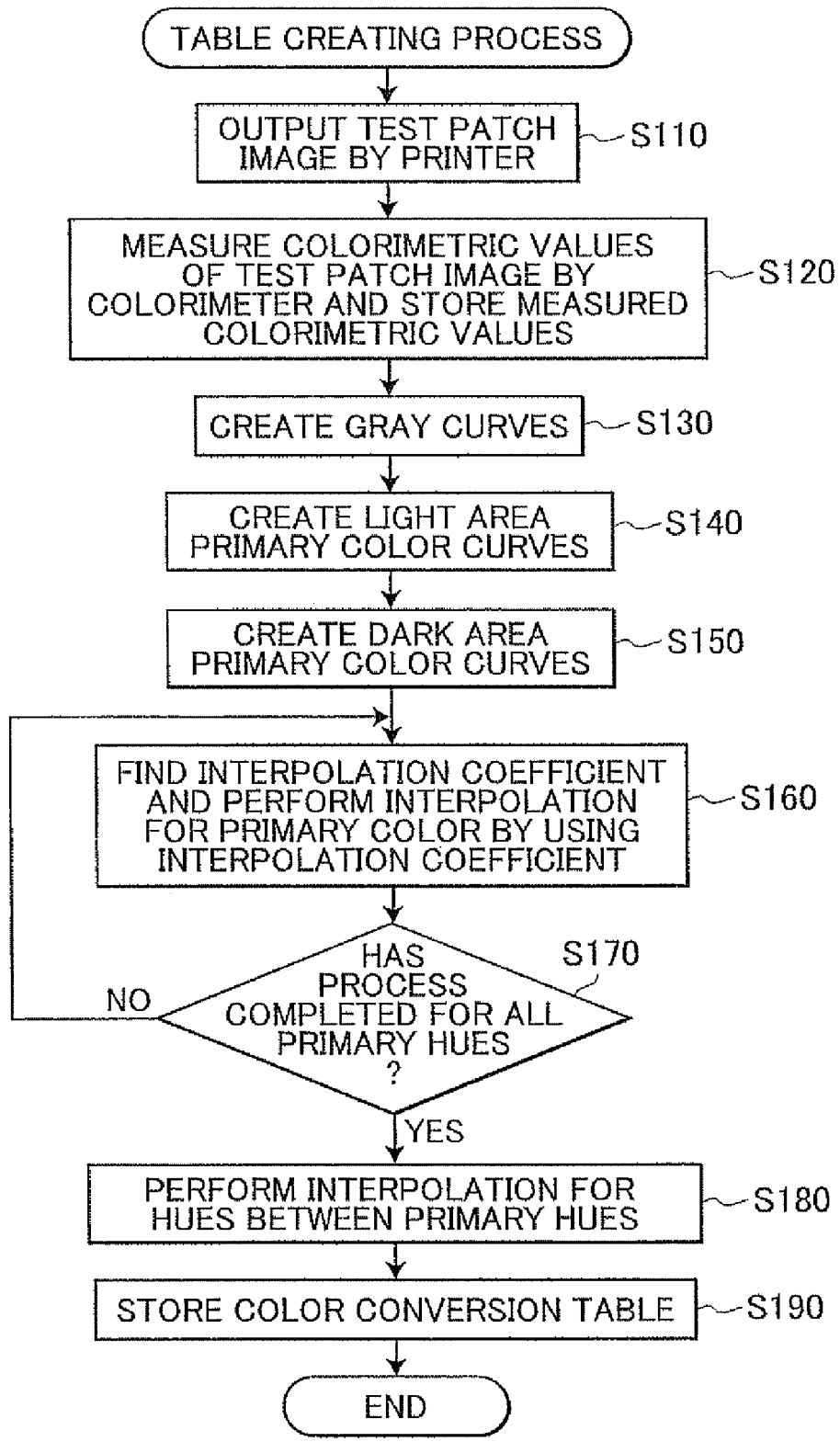
FIG. 4 is a flowchart illustrating steps in a table creation process executed by the color conversion table creating device.

FIG. 4 is a flowchart illustrating steps in a table creation process executed by the PC 10. The CPU 11 of the PC 10 executes the table creation process when the user has inputted an instruction to create a color conversion table 17a.

At the beginning of the table creation process in S110, the CPU 11 outputs test data to the printer 40. The test data includes density values from 0 to 255 for each of the colors CMYK and instructs the printer 40 to form a test patch image that includes a plurality of patches having gradually varying densities. The patches are formed in each of the colors CMYK. Control numbers are assigned to combinations of the density value and color corresponding to the patches in the test patch image.

In S120 the CPU 11 measures the colorimetric values of each patch in the test patch image using a colorimeter (not shown) and stores the measured values. The colorimeter is a device well known in the art for expressing colorimetric values of a measured patch in parameters of the L*a*b* color space (the parameters L*, a*, and b*) and outputting the measured L*a*b* values. In the process of S120, the CPU 11 stores the measured L*a*b* values of each test patch formed by the printer 40 in the RAM 15 in association with the corresponding control numbers.

The PC 10 prestores correlations between input color signals in the RGB color space and measured values in the L*a*b* color space acquired by measuring colors in the patches displayed on the monitor 23 based on the input color signals. Accordingly, the CPU 11 can find correlations between input color signals in the RGB color space and output color signals in the CMYK color space through the intermediary measured values in the L*a*b* color space.

In S130 the CPU 11 creates gray curves representing correlations between input color signals (RGB values) and output color signals (CMYK values) at points that are defined in the RGB color space shown in FIG. 3 are positioned on an achromatic axis 50 described later (see FIG. 5) connecting the white grid point P3 to the black grid point P0.

In S140 the CPU 11 creates, for each primary color, primary color curves for light areas (hereinafter, referred as "light area primary color curves") representing correlations between input color signals and output color signals at points in the RGB color space positioned on a light area primary color line 52 described later (see FIG. 5) connecting the white grid point P3 to the subject primary color grid point P1, P2, P4, P5, P6, or P7. In the first embodiment, the six colors red (R), green (G), blue (B), cyan (C), magenta (M), and yellow (Y) are preset as the primary colors.

In S150 the CPU 11 creates, for each primary color, primary color curves for dark areas (hereinafter, referred as "dark area primary color curves") representing correlations between input color signals and output color signals at points that are positioned on a dark area primary color line 54 described later (see FIG. 5) connecting the subject primary color grid point P1, P2, P4, P5, P6, or P7 to the black grid point P0.

In S160 the CPU 11 performs, for each hue including primary color (hereinafter, referred as "primary hue"), interpolation to calculate output color signals corresponding to the input color signals for all grid points that are positioned in a color gamut 56 defined by the achromatic axis 50, the light area primary color line 52, and the dark area primary color line 54.

Figure 5:
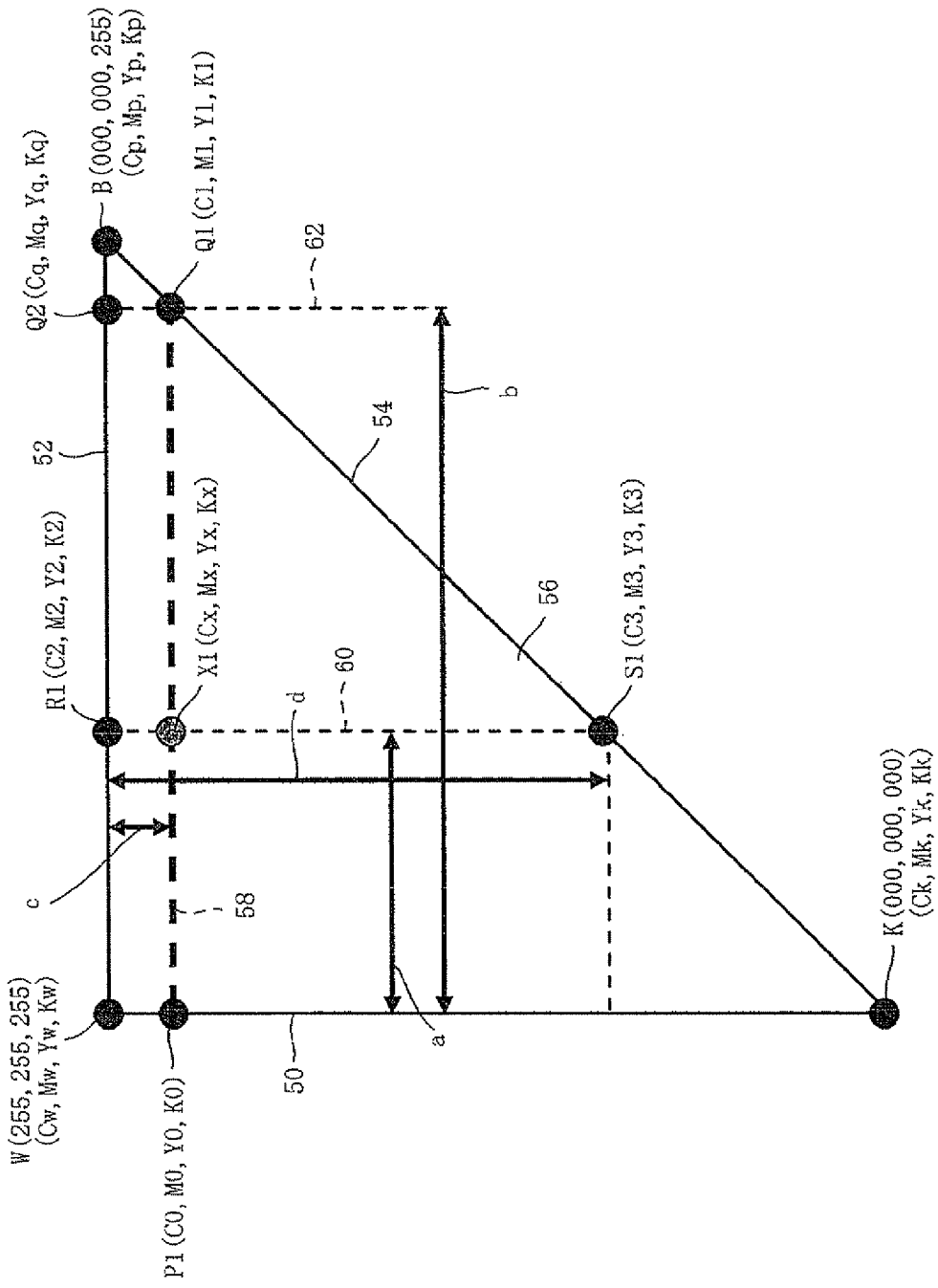
FIG. 5 is an explanatory diagram showing an interpolation process according to the first embodiment.

Next, the interpolation process performed in S160 will be described. FIG. 5 conceptually illustrates a primary color gamut 56 in the color gamut corresponding to a primary hue including the primary color (blue) extracted from the conical RGB color space (HSV color space). The primary color gamut 56 is defined by the achromatic axis 50 connecting black (K) to white (W), the light area primary color line 52 connecting white (W) to the primary color blue (B), and the dark area primary color line 54 connecting the primary color blue (B) to black (K). All output color signals (CMYK values) corresponding to points on at least one of the achromatic axis 50, light area primary color line 52, and dark area primary color line 54 are defined based on the gray curves, light area primary color curves, and dark area primary color curves that are created through the processes of S130-S150 shown in FIG. 4.

The CPU 11 finds output color signals (CMYK values) corresponding to the grid points that are positioned in the color gamut 56 using the output color signals (CMYK values) corresponding to points on the achromatic axis 50, light area primary color line 52, and dark area primary color line 54.

More specifically, the CPU 11 finds CMYK values for grid points in the color gamut 56 using CMYK values based on the gray curves found in S130, CMYK values based on the light area primary color curves found in S140, and CMYK values based on the dark area primary color curves found in S150.

For example, how to determine output color signals (CMYK values) corresponding to input color signals (RGB values) for a target grid point X1 will be described with reference to FIG. 5. First, the CPU 11 sets a first auxiliary line 58, and intersecting points P1 and Q1. The first auxiliary line 58 is parallel to the light area primary color line 52, passes through the target grid points X1, and intersects with the achromatic axis 50 and the dark area primary color line 54. The intersecting point P1 is a point at the intersection of the first auxiliary line 58 with the achromatic axis 50. The intersecting point Q1 is a point at the intersection of the first auxiliary line 58 with the dark area primary color line 54.

The CPU 11 also sets a third auxiliary line 60, and intersecting points R1 and S1. The intersecting point R1 is a point at the intersection of the third auxiliary line 60 with the light area primary color line 52. The third auxiliary line 60 is parallel to the achromatic axis 50, passes through the target input color signal X1, and intersects with the light area primary color line 52 and the dark area primary color line 54. The intersecting points S1 is a point at the intersection of the third auxiliary line 60 with the dark area primary color line 54. The intersecting point R1 is a point at the intersection of the third auxiliary line 60 with the light area primary color line 52. Further, the CPU 11 also sets a second auxiliary line 62, and a intersecting point Q2. The second auxiliary line 62 is parallel to the achromatic axis 50 and passes through the intersecting point Q1. The intersecting point Q2 is a point at the intersection of the light area primary color line 52 with the second auxiliary line 62.

Next, the CPU 11 determines output color signal (Cx, Mx, Yx, Kx) corresponding to the input color signal for the target grid point X1 through interpolation using an interpolation coefficient "k" based on the output color signals (CMYK values) corresponding to the intersecting points P1 and Q1, and through interpolation based on the distance from the target grid point X1 to the intersecting points R1 and S1.

The interpolation coefficient "k" is a value that reflects a light area data characteristic value "n" representing the characteristics between the output color signals (CMYK values) and the input color signals (RGB values) defined by the light area primary color line 52 (light area primary color curve). The light area data characteristic value "n" is a value based on the output color signal (Cq, Mq, Yq, Kq) corresponding to an intersecting point Q2 and the output color signal (C2, M2, Y2, K2) corresponding to the intersecting point R1.

The light area data characteristic value "n" is defined by the following Equation (1), for example.

$$n = (CMY2 - CMYw)/(CMYq - CMYw) \quad (1)$$

wherein CMYw=max(Cw, Mw, Yw);
wherein CMYq=max(Cq, Mq, Yq); and
wherein CMY2=max(C2, M2, Y2).

In Equation (1), a value "CMYw" is used as a reference value. The light area data characteristic value "n" is determined by calculating a ratio of a difference "(CMY2−CMYw)" divided by a reference difference "(CMYq−CMYw)". The value "CMYw" represents a value for the color having the highest value among values Cw, Mw, Yw, and Kw contained in the output color signal corresponding to the white point W. The value "CMYq" is the highest value among values Cq, Mq, Yq, and Kq contained in the output color signal corresponding to the intersecting point Q2. The value "CMY2" is the highest value among values C2, M2, Y2, and K2 contained in the output color signals corresponding to the intersecting point R1. Thus, the light area data characteristic value "n" is determined by using each highest value among values contained in the output color signal corresponding to each intersecting point. In this way, it is possible to set an appropriate light area data characteristic value "n" for colors that have the greatest effect on color tones.

Next, the CPU 11 finds the interpolation coefficient "k" based on the light area data characteristic value "n" determined as described above and the distances to the intersecting points. More specifically, the CPU 11 multiplies distance data "a/b" by a weight "c/d", multiplies the light area data characteristic value "n" by a weight "(d−c)/d", and adds the two multiplied values to obtain the interpolation coefficient "k". Equation (2) below shows an example formula for calculating the interpolation coefficient "k".

$$k = n^*(d-c)/d + a/b^*c/d \quad (2)$$

Here, the distance data "a/b" is the ratio of a distance "a" between the intersecting point P1 and the target grid point X1 to a distance "b" between the intersecting points P1 and Q1. The distance "c" is the distance between the intersecting point R1 and the target grid point X1, while the distance "d" is the distance between the intersecting points R1 and the S1. Hence, the distance data "a/b" and the weights "(d−c)/d" and "c/d" are set such that the weight applied to the light area data characteristic value "n" becomes larger as the target grid point X1 is positioned nearer the light area primary color line 52 in the color gamut 56.

Next, the CPU 11 performs an interpolation according to the following Equation (3) using the interpolation coefficient "k", the output color signal (C0, M0, Y0, K0) corresponding to the intersecting point P1 and output color signal (C1, M1, Y1, K1) corresponding to the intersecting point Q1, and obtains a horizontal interpolation result Cx1 along the horizontal axis in the primary color gamut 56. The CPU 11 also obtains a vertical interpolation result Cx2 along the vertical axis by interpolating the output color signal (C2, M2, Y2, K2) corresponding to the intersecting point R1 and the output color signal (C3, M3, Y3, K3) corresponding to the intersecting point S1 using the weights "c/d" representing the distance, in accordance with the following Equation (4).

Next, the CPU 11 finds a cyan value Cx contained in output color signal corresponding to the target grid point X1 by averaging the horizontal interpolation result Cx1 and vertical interpolation result Cx2, as shown in the following Equation (5).

$$Cx1 = C0 + (C1-C0)^*k \quad (3)$$

$$Cx2 = C2 + (C3-C2)^*c/d \quad (4)$$

$$Cx = (Cx1 + Cx2)/2 \quad (5)$$

Similarly, the each value Mx, Yx, and Kx contained in the output color signal corresponding to the target grid point X1 can be found according to the equations (1)-(5) by replacing cyan values with each color values. As described above, the CPU 11 determines correspondence relationship for each grid point between an output color signal representing CYMK values and an input color signal representing RGB values in S160. Specifically, the CPU 11 determines correspondence relationships for grid points that are positioned on one of the achromatic axis 50, the light area primary color line 52, and the dark are primary color line 54 based on the gray curves, the light area primary color curves, the dark area primary color curves, and determines correspondence relationships for remaining grid points that are positioned in the primary color gamut 56 except for the grid points that are positioned on one of the achromatic axis 50, the light area primary color line 52, and the dark are primary color line 54 by performing interpolation by using the interpolation coefficient.

Returning to the flowchart in FIG. 4, in S170 the CPU 11 determines whether the interpolation process has been performed for all primary hues (all primary color gamut 56). When the CPU 11 determines that there remain primary hues to process (S170: NO), the CPU 11 returns to S160 and repeats the interpolation process for the next primary hue.

When the CPU 11 determines that the process has been completed for all primary hues (S170: YES), in S180 the CPU 11 finds correlations between input color signals (RGB values) and output color signals (CMYK values) for grid points that are positioned outside the primary color gamut 56 between the primary hues, based on processing results for the grid point that positioned in the primary color gamut 56 for the primary hues. In S190 the CPU 11 creates the color conversion table indicating the correspondence relationship between the input color signals and the output color signals for the grid points, and stores this color conversion table in the HDD 17. And then, the CPU 11 ends the table creation process.

Through the table creating process in the first embodiment, the CPU 11 finds output color signals by performing the interpolation using the interpolation coefficient "k" that reflects the light area primary color curves in the CMYK color space. Accordingly, the CPU 11 can create the color conversion table 17a storing the correlations between the RGB values and CMYK values capable of realizing superior tone expression, despite the light area primary color curves having a nonlinear relationship with changes in color from white to the primary color.

Further, the interpolation coefficient "k" reflects the light area data characteristic value "n", which represents characteristics of the light area primary color curves in the CMYK color space. Hence, the CPU 11 can determine output color signals suitable for characteristics of light area primary color curves in the CMYK color space.

Further, since the interpolation coefficient "k" amplifies the weight of the light area data characteristic values "n" as the target grid point X1 is positioned nearer the light area primary color line 52 in the color gamut 56, the CPU 11 can more reliably create the color conversion table 17a with superior tone expression. In other words, it is possible to find more suitable output color signals by setting weights as described above in order that the characteristics of the light area primary color curves have more influence as the grid point is defined nearer the light area primary color line 52.

After performing the table creating process shown in FIG. 4, the CPU 11 may subsequently perform an additional process well known in the art to finely adjust the color conversion table 17a in response to an instruction from the user. However, such fine adjustments to the color conversion table 17a are not essential since the table creating process of the first embodiment can automatically create the color conversion table 17a with superior tone expression.

Next, a color conversion table creating system 1 according to second embodiment will be described while referring to FIG. 6. In the second embodiment, the table creating system 1 has the same construction as the first embodiment, and performs the same processes in the table creating process (FIG. 4) as the first embodiment except for an interpolation process that performed in S160. Therefore, the interpolation process in the second embodiment will be described with reference to FIG. 6.

Figure 6:
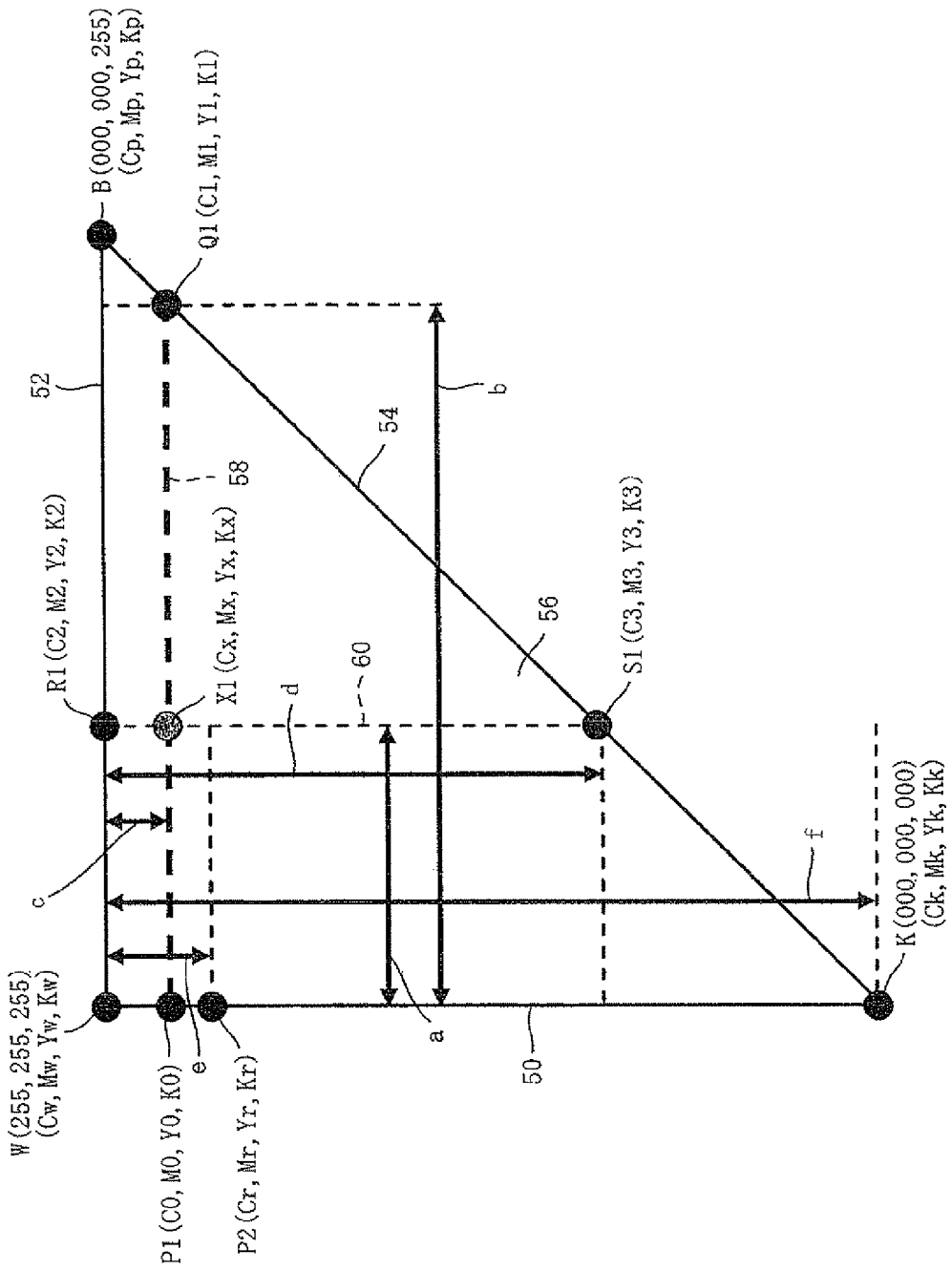
FIG. 6 is an explanatory diagram showing an interpolation process according to a second embodiment.

FIG. 6 conceptually illustrates the color gamut 56 for blue extracted from the conical RGB (color space (HSV color space) and defined by the achromatic axis 50, the light area primary color line 52, and the dark area primary color line 54. The intersecting points P1, R1, S1, and Q1 and the first and third auxiliary lines 58 and 60 are the same as the first embodiment. Further, the values Cx, Yx, and Mx contained in the output color signal (Cx, Yx, Mx, Kx) corresponding to the target grid point X1 are calculated by using Equations (1)-(5) as described in the first embodiment. Therefore, the description of the second embodiment will focus on a method of calculating the value Kx in the output color signal corresponding to the target grid point X1.

In the interpolation process of the first embodiment, the PC 10 determines a light area data characteristic value "n" representing characteristics of the light area primary color curves and reflects this light area data characteristic value "n" in the interpolation coefficient "k". However, in the second embodiment, the PC 10 determines a gray data characteristic value "o" representing characteristics of the gray curves and performs an interpolation using an interpolation coefficient "m" reflecting this gray data characteristic value "o" in order to determine the value Kx in the output color signal corresponding to the target grid point X1.

The gray data characteristic value "o" is determined by using Equation (6) described below based on K values included in the gray curves, for example.

$$o=(Kr-Kw)/(Kk-Kw) \qquad (6)$$

Here, "Kr" is the K value for a point P2 on the achromatic axis 50, "Kk" the K value for the black point K, and "Kw" the K value for the white point W. The point P2 is defined as the point satisfying the condition in Equation (7) below.

$$c/d=e/f \qquad (7)$$

Here, "c" is the distance between the intersecting point R1 and the target grid point X1, "d" the distance between the intersecting points R1 and S1, "e" the distance between the white point W and the point P2, and "f" the distance between the white point W to the black point K.

Therefore, if a reference value is set to the K value Kw corresponding to the white point W, the gray data characteristic value "o" is a value representing the ratio of the difference "(Kr-Kw)" between the K value "Kr" corresponding to the intersecting point P2 and the reference value to the difference "(Kk-Kw)" between K value "Kk" corresponding to black point K and the reference value.

Next, the PC 10 determines the interpolation coefficient "m" based on the gray data characteristic value "o" determined as described above and distances from the target grid point X1 to the intersecting points. More specifically, the CPU 11 of the PC 10 multiplies distance data "c/d" by a weight "a/b", multiplies the gray data characteristic value "o" by a weight "(b-a)/b", and adds the two multiplied value to obtain the interpolation coefficient "m".

$$m=o*(b-a)/b+c/d*a/b \qquad (8)$$

Here, the distance data "c/d" is the ratio of the distance "c" between the intersecting point R1 and the target grid point X1 to the distance "d" between the intersecting points R1 and S1. The distance "a" is the distance between the intersecting point P1 and the target grid point X1, while the distance "b" is the distance between the intersecting points P1 and Q1. Hence, the distance data "c/d" and weights "(b-a)/b" and "a/b" applied to the gray data characteristic value "o" are set such that the weight applied to the gray data characteristic value "o" grows larger as the target grid point X1 nears the achromatic axis 50 in the color gamut 56.

Next, the CPU 11 obtains a horizontal interpolation result "Kx1" along the horizontal axis in the color gamut 56 through interpolation according to Equation (9) below, for example, using the interpolation coefficient "m" found as described above, the K values "K0" and "K1" in the output color signals corresponding to the intersecting points P1 and Q1.

The CPU 11 also obtains a vertical interpolation result "Kx2" along the vertical axis in the color gamut 56 by interpolating the K value "K2" corresponding to the intersecting point R1 and the K value "K3" corresponding to the intersecting point S1 using the distance data "c/d", as shown in Equation (10) below. And then, the CPU 11 determines a black value "Kx" in the output color signals corresponding to the target grid point X1 by averaging the horizontal interpolation result "Kx1" and the vertical interpolation result "Kx2", as shown in Equation (11) below.

$$Kx1 = K0 + (K1 - K0) * m \quad (9)$$

$$Kx2 = K2 + (K3 - K2) * c/d \quad (10)$$

$$Kx = (Kx1 + Kx2)/2 \quad (11)$$

Through the interpolation method according to the second embodiment, the CPU 11 can create a color conversion table 17a with superior tone expression, despite the gray curves having a nonlinear relationship with changes in color from white to black. Further, by determining output color signals suitable for the characteristics of the gray curves, the CPU 11 can create a color conversion table 17a with more superior color gradation.

Since the weight of the gray data characteristic value "o" grows larger as the target grid point X1 approaches the achromatic axis 50 in the primary color gamut 56, the interpolation method according to the second embodiment can create a color conversion table 17a providing more superior tone expression. In other words, it is possible to determine more suitable output color signals by setting weights as described above in order that the characteristics of the gray curves have more influence as the target grid point X1 approaches the achromatic axis 50.

Next, a table creating system 1 according to a third embodiment will be described. The table creating system 1 according to the third embodiment has the same construction as the first embodiment, and performs the same processes in the table creating process (FIG. 4) as the first embodiment except for an interpolation process in S160. The interpolation process of the third embodiment will be described with reference to FIG. 7.

Figure 7:
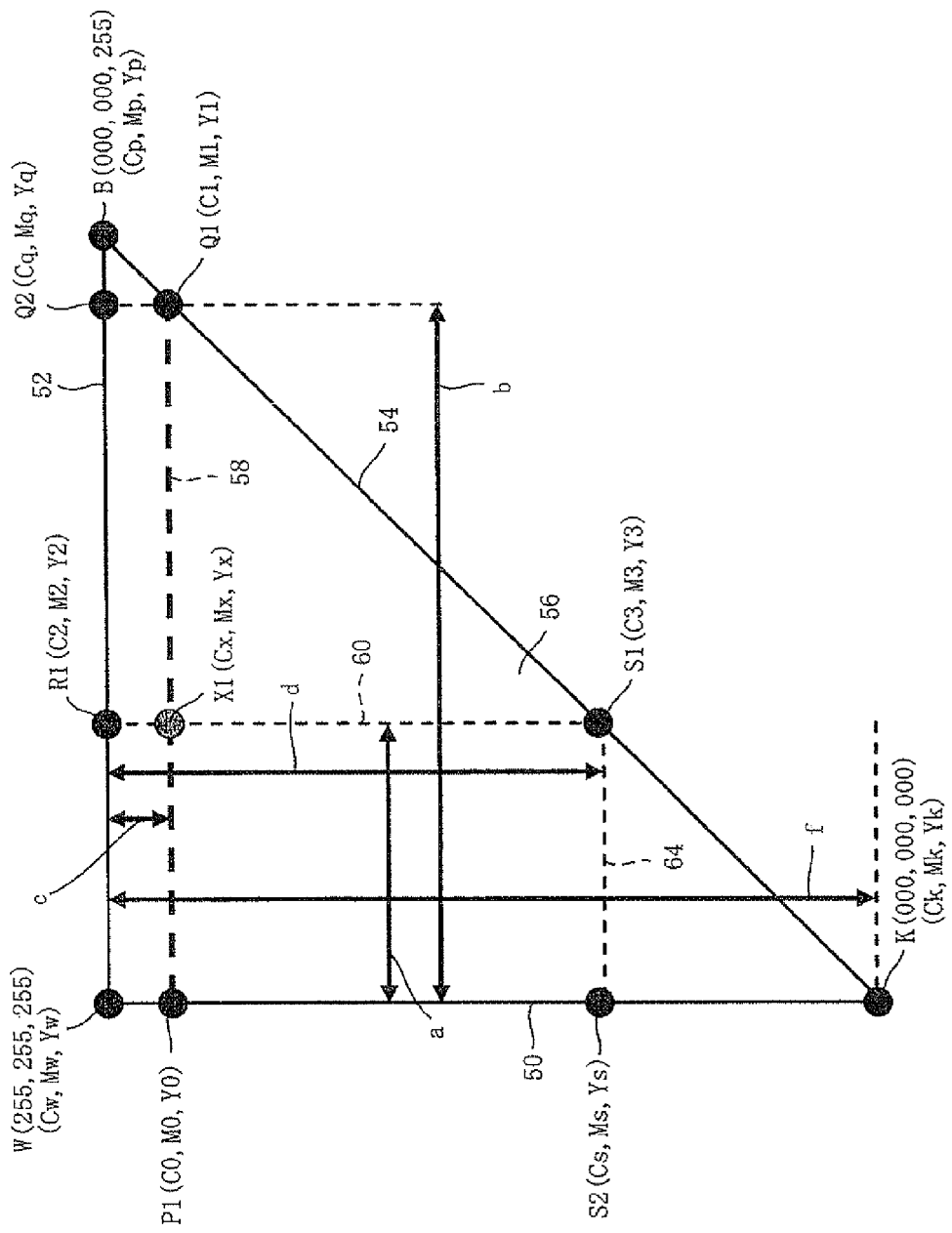
FIG. 7 is an explanatory diagram showing an interpolation process according to a third embodiment.
Figure 8A:
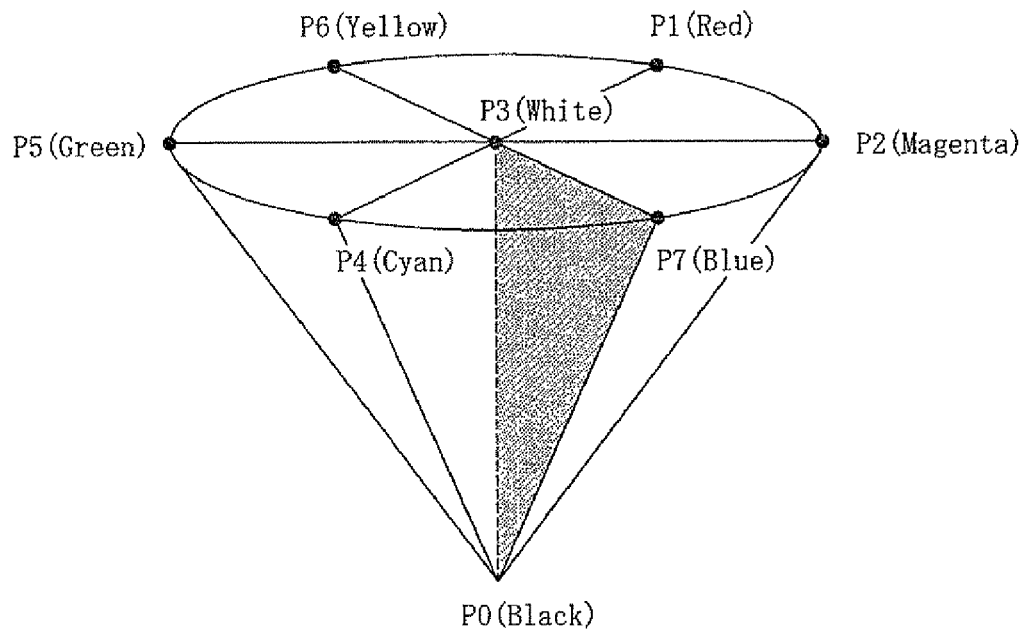
FIG. 8($a$) is a conceptual diagram showing an input color space.
Figure 8B:
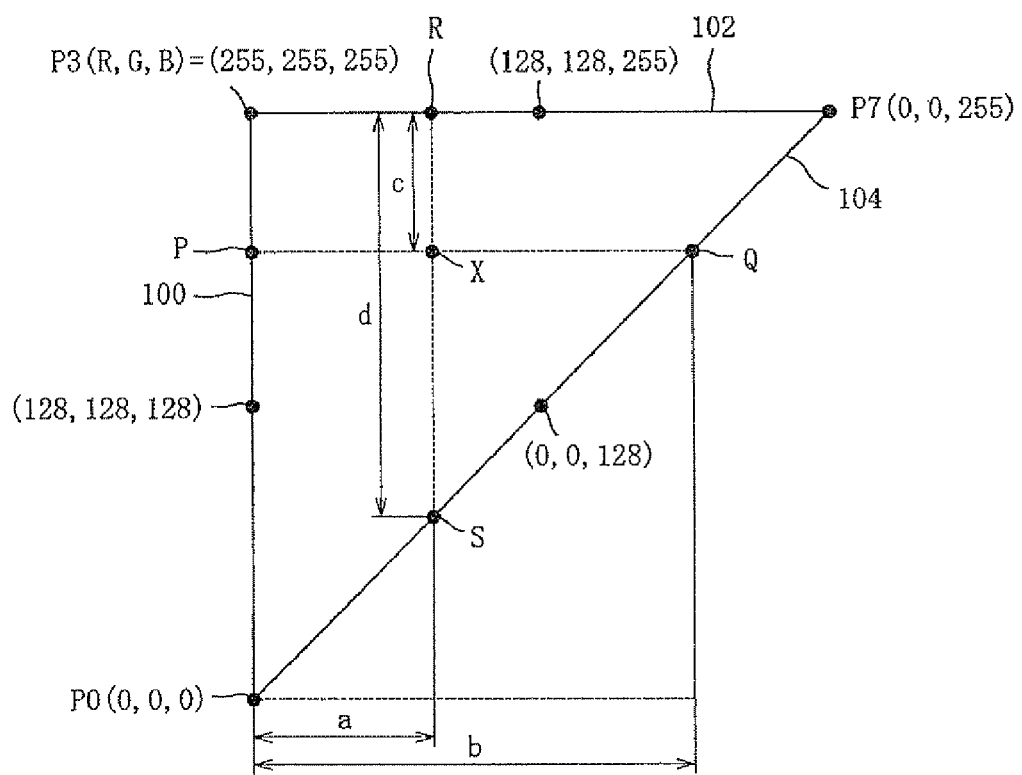
Figure 9A:
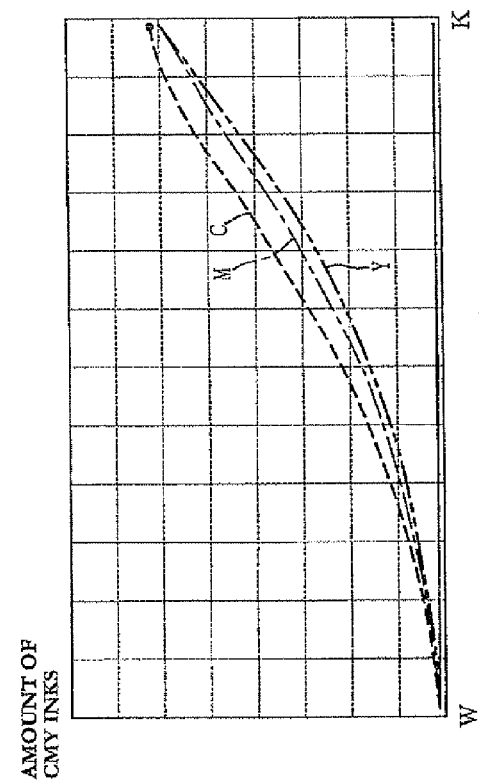
FIG. 9($a$) is a graph showing experimental results for finding the relationship between changes in color from white to black and the amount of ink required for rendering the color in CMY values.
Figure 9B:
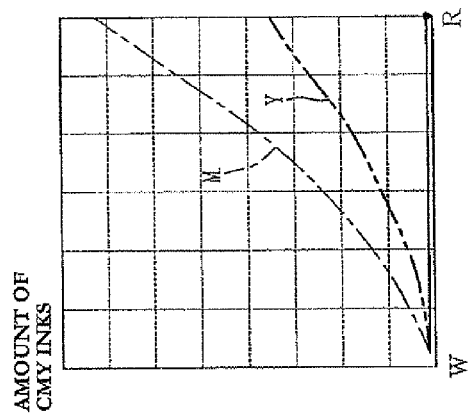
Figure 9C:
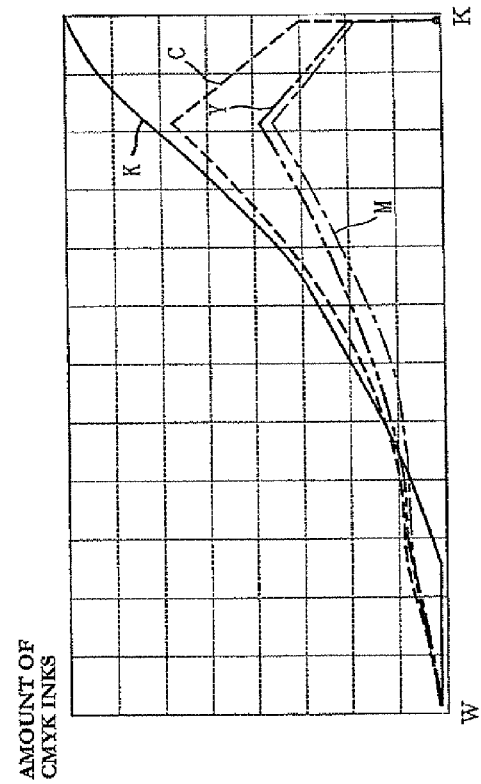
Figure 9D:
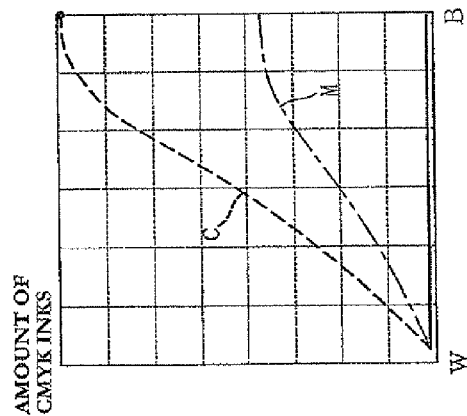

FIG. 7 conceptually illustrates the color gamut 56 for blue defined by the achromatic axis 50, the light area primary color line 52, and the dark area primary color line 54. The intersecting points P1, R1, S1, and Q1 and the first and third auxiliary lines 58 and 60 are the same as the first embodiment.

In the first and second embodiments described above, the color conversion table 17a serves to convert input color signals configured of RGB values to output color signals configured of the four CMYK values. However, the following description involves the interpolation method according to the third embodiment for creating a color conversion table 17a that serves to convert input color signals to output color signals configured of the three values CMY. This interpolation process is often performed when printing on glossy paper since it is necessary to from images without using black, which has a low ink-fixing property. When printing a test patch image in the table creation process according to the third embodiment, the PC 10 instructs the printer 40 to form patches using ink of the three colors cyan, magenta, and yellow, whereby the PC 10 creates gray curves, light area primary color curves, and dark area primary color curves expressing correlations between the RGB input color signals and the CMY output color signals.

In the first embodiment described above, the PC 10 determines output color signals (Cx, Mx, Yx, and Kx) using the interpolation coefficient "k" that reflects the light area data characteristic value "n" expressing characteristics of the light area primary color curves. In the second embodiment, the PC 10 determines the K value "Kx" in the output color signals using the interpolation coefficient "m" that reflects the gray data characteristic value "o" expressing characteristics of the gray curves. In the third embodiment, in addition to determining the same interpolation coefficient "k" as described in the first embodiment, the PC 10 also determines an interpolation coefficient "m'" reflecting a gray data characteristic value "o'", and determines output color signal (Cx, Mx, and Yx) corresponding to the input color signal through interpolation using both coefficients "k" and "m'". Since the interpolation coefficient "k" is determined in the same way as described in the first embodiment, a description of this calculation will be omitted here. However, the gray data characteristic value "o'" used in the third embodiment differs from the gray data characteristic value "o" described in the second embodiment. Hence, the method of determining the gray data characteristic value "o'" will be described below.

The gray data characteristic value "o" according to the second embodiment is determined based on the K values included in the gray curves. However, in the third embodiment the PC 10 determines the gray data characteristic value "o'" without using K value. In order to determine this gray data characteristic value "o'", the PC 10 first sets a fourth auxiliary line 64 and a new intersecting point S2. The fourth auxiliary line 64 is parallel to the light area primary color line 52 and passes through the intersecting point S1. The intersecting point S2 is located at the point of intersection of the fourth auxiliary line 64 with the achromatic axis 50.

The gray data characteristic value "o'" can be defined by Equation (12) below, for example, which uses the output color signal (C0, M0, and Y0) corresponding to the intersecting point P1, the output color signal (Cw, Mw, and Yw) corresponding to white W, and the output color signal (Cs, Ms, and Ys) corresponding to the intersecting point S2.

$$o' = (CMY0 - CYMw)/(CMYs - CMYw) \quad (12)$$

$$CMY0 = \max(C0, M0, Y0)$$

$$CMYs = \max(Cs, Ms, Ys)$$

$$CMYw = \max(Cw, Mw, Yw)$$

Specifically, if a reference value is set as a value "CMYw" for the color having the highest value among output color signal (Cw, Mw, and Yw) corresponding to white, the gray data characteristic value "o'" represents the ratio of the difference "CMY0−CMYw" between a value "CMY0" for the color having the highest value among C0, M0, and Y0 corresponding to the intersecting point P1 and the reference value to the difference "CMYs−CMYw" between a value "CMYs" for the color having the highest value among Cs, Ms, and Ys corresponding to the intersecting point S2 and the reference value. In this way, it is possible to set an appropriate gray data characteristic value "o'" for colors that have the greatest effect on color tones.

Next, the CPU 11 determines the interpolation coefficient "m'" based on the gray data characteristic value "o'" determined as described above, and the distance data indicating distances between the target grid point and each intersecting point. More specifically, the CPU 11 multiplies distance data "c/d" by a weight "a/b", multiplies the gray data characteristic value "o'" by a weight "(b−a)/b", and adds the two multiplied results to obtain the interpolation coefficient "m'". This calculation is expressed in Equation (13) below.

$$m'=o'*(b-a)/b+c/d*a/b \quad (13)$$

Since the weights multiplied by the gray data characteristic value o' and the distance data is identical to the weights described in the second embodiment, a description of these weights will not be repeated in the third embodiment.

Output color signals corresponding to the input color signals may be found according to Equations (14)-(16) below, for example, using the interpolation coefficients "k" and "m'" found as described above.

$$Cx1=C0+(C1-C0)*k \quad (14)$$

$$Cx2=C2+(C3-C2)*m' \quad (15)$$

$$Cx=(Cx1+Cx2)/2 \quad (16)$$

The above equations are used to calculate a cyan value Cx contained in the output color signal (Cx, Mx, Yx) corresponding to the target grid point X1. Similarly, the values Mx and Yx can be found by substituting values corresponding color by into the equations (14)-(16).

According to the table creation process in the third embodiment, the CPU 11 can create a color conversion table 17a providing superior tone expression, despite the light area primary color curves having a nonlinear relationship with changes in color from white to the primary color and despite the gray curves having a nonlinear relationship to changes in color from white to black.

While the invention has been described in detail with reference to the first, second, and third embodiments thereof, it would be apparent to those skilled in the art that various changes and modifications may be made therein without departing from the spirit of the invention.

For example, while the printer 40 is an inkjet printer in the first, second, and third embodiments described above, the printer 40 may be a laser printer.

In the first, second, and third embodiments described above, the CPU 11 creates the color conversion table 17a and performs the color conversion process. However, the PC 10 may create the color conversion table 17a and transmit the table to the printer so that the color conversion process is executed on the printer. Alternatively, the printer 40 may create the color conversion table and perform the color conversion process.

In the first, second, and third embodiments described above, the first auxiliary line 58 is parallel to the light area primary color line 52, and the third auxiliary line 60 is parallel to the achromatic axis 50. However, it is possible to perform the processes described in the preferred embodiment while setting a first auxiliary line that is not parallel to the light area primary color line 52 and a third auxiliary line that is not parallel to the achromatic axis 50.

What is claimed is:

1. A color conversion table creating device for creating a color conversion table indicating correspondence relationships for grid points between input color signals representing values in an input color space defined in an input-side device and output color signals representing values in an output color space defined in an output-side device, a color gamut, primary colors, a gray line, light lines, and dark lines, and the grid points being defined in the input color space, the gray line connecting white and black, one light line being defined for each primary color as a line connecting white and the subject primary color, one dark line being defined for each primary color as a line connecting black and the subject primary color, the color gamut including primary color gamuts, one primary color gamut being defined for each primary color by the gray line, the light line corresponding to the subject primary color, and the dark line corresponding to the subject primary color, the grid points having first grid points and second grid points different from the first grid points, the first grid points and the second grid points being positioned in the primary color gamuts, the first grid points being positioned on at least one of the gray line, light lines, and dark lines, the color conversion table creating device comprising:

a gray data creating unit that creates gray data representing a correspondence relationship between input color signals and output color signals for prescribed points that are positioned on the gray line;

a light area data creating unit that creates, for each primary color, light area data representing a correspondence relationship between input color signals and output color signals for prescribed points that are positioned on the light line;

a dark area data creating unit that creates, for each primary color, dark area data representing a correspondence relationship between input color signals and output color signals for prescribed points that are positioned on the dark line;

a first grid point correspondence relationship determining unit that determines, for each first grid point, first grid point correspondence relationship between an input color signal and an output color signal, based on the gray data, the light area data, and the dark area data;

a second grid point correspondence relationship determining unit that determines, for each second grid point, a second grid point correspondence relationship between an input color signal and an output color signal, the second grid point correspondence relationship determining unit including:

a gray-dark auxiliary line setting unit that sets, in a primary color gamut in which the each second grid point is positioned, a gray-dark auxiliary line passing through the each second grid point and intersecting with both the gray line and the dark line;

an intersecting point setting unit that sets a point at intersection of the gray-dark auxiliary line with the gray line as a gray-dark auxiliary line gray intersecting point, and sets a point at intersection of the gray-dark auxiliary line with the dark line as a gray-dark auxiliary line dark intersecting point;

an intersecting point signal determining unit that determines, based on the gray data and the dark area data, an output color signal corresponding to the gray-dark auxiliary line gray intersecting point and an output color signal corresponding to the gray-dark auxiliary line dark intersecting point;

an interpolation coefficient determining unit that determines, for the each second grid point, a light interpolation coefficient that reflects characteristic of the light area data; and a second grid point interpolating unit that determines, for the each second grid point, a second grid point correspondence relationship between an input color signal and an output color signal by performing interpolation between the output color signals corresponding to the gray-dark auxiliary line gray intersecting point and the gray-dark auxiliary line dark intersecting point by using the light interpolation coefficient; and a color conversion table creating unit that creates a color conversion table indicating the first grid point correspondence relationships for the first grid points and the second grid point correspondence relationships for the second grid points.

2. The color conversion table creating device according to claim 1, wherein the gray-dark auxiliary line set in the primary color gamut in which the each second grid point is positioned is parallel to the light line defined in the primary color gamut in which the each second grid point is positioned.

3. The color conversion table creating device according to claim 1, wherein the second grid point correspondence relationship determining unit further includes:

a first light-dark auxiliary line setting unit that sets, in a primary color gamut in which the each second grid point is positioned, a first light-dark auxiliary line parallel to the gray line and passing through the gray-dark auxiliary line dark intersecting point; and a second light-dark auxiliary line setting unit that sets, in a primary color gamut in which the each second grid point is positioned, a second light-dark auxiliary line parallel to the gray line and passing through the each second grid point;

wherein the intersecting point setting unit further sets a point at intersection of the first light-dark auxiliary line with the light line as a first light-dark auxiliary line light intersecting point, and sets a point at intersection of the second light-dark auxiliary line with the light line as a second light-dark auxiliary line light intersecting point;

wherein the color conversion table creating device further comprises a light data characteristic value determining unit that determines a light data characteristic value based on output color signals corresponding to the first light-dark auxiliary line light intersecting point and the second light-dark auxiliary line light intersecting point; and wherein the interpolation coefficient determining unit determines the light interpolation coefficient based on the light data characteristic value.

4. The color conversion table creating device according to claim 3, wherein the interpolation coefficient determining unit determines the light interpolation coefficient for the each second grid point by adding distance data to weight data, the distance data being a ratio of a distance between the gray-dark auxiliary line gray intersecting point and the each second grid point to a distance between the gray-dark auxiliary line gray intersecting point and the gray-dark auxiliary line dark intersecting point, the weight data being determined by multiplying the light data characteristic value by a weight value; and wherein the weight value becomes larger as the each second grid point is positioned nearer the light line in the primary color gamut in which the each second grid point is positioned.

5. The color conversion table creating device according to claim 3, wherein the output color signal has a plurality of color values; and wherein the light data characteristic value determining unit determines a light data characteristic value based on a highest color value among the plurality of color values the output color signal corresponding to the first light-dark auxiliary line light intersecting point and a highest color value among the plurality of color values in the output color signal corresponding to the second light-dark auxiliary line light intersecting point.

6. The color conversion table creating device according to claim 1, wherein the grid points include third grid points that are positioned outside the primary color gamuts in the color gamut, wherein the conversion table creating device further comprises a third grid point correspondence relationship determining unit that determines, for each third grid point, a third grid point correspondence relationship between an input color signal and an output color signal based on the first grid point correspondence relationships and the second grid point correspondence relationships, and wherein the conversion table creating unit creates the conversion table indicating the first grid point correspondence relationships for the first grid points, the second grid point correspondence relationships for the second grid points, and the third grid point correspondence relationships for the third grid points.

7. A color conversion table creating device for creating a color conversion table indicating correspondence relationships for grid points between input color signals representing values in an input color space defined in an input-side device and output color signals representing values in an output color space defined in an output-side device, a color gamut, primary colors, a gray line, light lines, and dark lines, and the grid points being defined in the input color space, the gray line connecting white and black, one light line being defined for each primary color as a line connecting white and the subject primary color, one dark line being defined for each primary color as a line connecting black and the subject primary color, the color gamut including primary color gamuts, one primary color gamut being defined for each primary color by the gray line, the light line corresponding to the subject primary color, and the dark line corresponding to the subject primary color, the grid points having first grid points and second grid points different from the first grid points, the first grid points and the second grid points being positioned in the primary color gamuts, the first grid points being positioned on at least one of the gray line, light lines, and dark lines, the color conversion table creating device comprising:

a gray data creating unit that creates gray data representing a correspondence relationship between input color signals and output color signals for prescribed points that are positioned on the gray line;

a light area data creating unit that creates, for each primary color, light area data representing a correspondence relationship between input color signals and output color signals for prescribed points that are positioned on the light line;

a dark area data creating unit that creates, for each primary color, dark area data representing a correspondence relationship between input color signals and output color signals for prescribed points that are positioned on the dark line;

a first grid point correspondence relationship determining unit that determines, for each first grid point, first grid point correspondence relationship between an input color signal and an output color signal, based on the gray data, the light area data, and the dark area data;

a second grid point correspondence relationship determining unit that determines, for each second grid point, a second grid point correspondence relationship between an input color signal and an output color signal, the second grid point correspondence relationship determining unit including:

a light-dark auxiliary line setting unit that sets, in a primary color gamut in which the each second grid point is positioned, a light-dark auxiliary line passing through the each second grid point and intersecting with both the light line and the dark line;

an intersecting point setting unit that sets a point at intersection of the light-dark auxiliary line with the light line as a light-dark auxiliary line light intersecting point, and sets a point at intersection of the light-dark auxiliary line with the dark line as a light-dark auxiliary line dark intersecting point;

an intersecting point signal determining unit that determines, based on the light data and the dark area data, an output color signal corresponding to the light-dark auxiliary line light intersecting point and an output color signal corresponding to the light-dark auxiliary line dark intersecting point;

an interpolation coefficient determining unit that determines, for the each second grid point, a gray interpolation coefficient that reflects characteristic of the gray data; and a second grid point interpolating unit that determines, for the each second grid point, a second grid point correspondence relationship between an input color signal and an output color signal by performing interpolation between the output color signals corresponding to the light-dark auxiliary line light intersecting point and the light-dark auxiliary line dark intersecting point by using the gray interpolation coefficient; and a color conversion table creating unit that creates a color conversion table indicating the first grid point correspondence relationships for the first grid points and the second grid point correspondence relationships for the second grid points.

8. The color conversion table creating device according to claim 7, wherein the second grid point correspondence relationship determining unit further comprises a gray data characteristic value determining unit that determines, for the each second grid point, a gray data characteristic value based on output color signals corresponding to prescribed points that are positioned on the gray line based on the gray data; and wherein the interpolation coefficient determining unit determines the gray interpolation coefficient based on the gray data characteristic value.

9. The color conversion table creating device according to claim 7, wherein the interpolation coefficient determining unit determines the interpolation coefficient by adding distance data to weight data, the distance data being a ratio of a distance between the light-dark auxiliary line light intersecting point and the each second grid point to a distance between the light-dark auxiliary line light intersecting point and the light-dark auxiliary line dark intersecting point, the weight data being determined by multiplying the gray data characteristic value by a weight value; and wherein the weight value becomes larger as the each second grid point is positioned nearer the gray line in the primary color gamut in which the each second grid point is positioned.

10. The color conversion table creating device according to claim 9, wherein the second grid point correspondence relationship determining unit further includes a gray-dark auxiliary line setting unit that sets, in a primary color gamut in which the each second grid point is positioned, a gray-dark auxiliary line passing through the each second grid point and intersecting with both the gray line and the dark line;

wherein the intersecting point setting unit further sets a point at intersection of the gray-dark auxiliary line with the gray line as a gray-dark auxiliary line gray intersecting point, and sets a point at intersection of the gray-dark auxiliary line with the dark line as a gray-dark auxiliary line dark intersecting point;

wherein the intersecting point signal determining unit further determines an output color signal corresponding to the gray-dark auxiliary line gray intersecting point and an output color signal corresponding to the gray-dark auxiliary line dark intersecting point based on the gray data and the dark area data;

wherein the interpolation coefficient determining unit further determines a light interpolation coefficient that reflects characteristic of the light area data; and wherein the second grid point correspondence relationship determining unit further includes:

a light-dark interpolation value calculating unit that calculates, for each second grid point, a light-dark interpolation value by performing interpolation between the output color signals corresponding to the light-dark auxiliary line light intersecting point and the light-dark auxiliary line light dark intersecting point by using the gray interpolation coefficient; and a gray-dark interpolation value calculating unit that calculates, for the each second grid point, a gray-dark interpolation value by performing interpolation between the output color signals corresponding to the gray-dark auxiliary line gray intersecting point and the gray-dark auxiliary line dark intersecting point by using the light interpolation coefficient; and wherein the interpolation unit determines, for the each second grid point, the second grid point correspondence relationship based on the gray-dark interpolation value and the light-dark interpolation value.

11. A method for creating a color conversion table indicating correspondence relationships for grid points between input color signals representing values in an input color space defined in an input-side device and output color signals representing values in an output color space defined in an output-side device, a color gamut, primary colors, a gray line, light lines, and dark lines, and the grid points being defined in the input color space, the gray line connecting white and black, one light line being defined for each primary color as a line connecting white and the subject primary color, one dark line being defined for each primary color as a line connecting black and the subject primary color, the color gamut including primary color gamuts, one primary color gamut being defined for each primary color by the gray line, the light line corresponding to the subject primary color, and the dark line corresponding to the subject primary color, the grid points having first grid points and second grid points different from the first grid points, the first grid points and the second grid points being positioned in the primary color gamuts, the first grid points being positioned on at least one of the gray line, light lines, and dark lines, the method comprising:

creating, with a color conversion table creating device, gray data representing a correspondence relationship between input color signals and output color signals for prescribed points that are positioned on the gray line;

creating, for each primary color, light area data representing a correspondence relationship between input color signals and output color signals for prescribed points that are positioned on the light line;

creating, for each primary color, dark area data representing a correspondence relationship between input color signals and output color signals for prescribed points that are positioned on the dark line;

(a) determining, for each first grid point, first grid point correspondence relationship between an input color signal and an output color signal, based on the gray data, the light area data, and the dark area data;

(b) determining, for each second grid point, a second grid point correspondence relationship between an input color signal and an output color signal, the (b) determining step including:

setting, in a primary color gamut in which the each second grid point is positioned, a gray-dark auxiliary line passing through the each second grid point and intersecting with both the gray line and the dark line;

setting a point at intersection of the gray-dark auxiliary line with the gray line as a gray-dark auxiliary line gray intersecting point;

setting a point at intersection of the gray-dark auxiliary line with the dark line as a gray-dark auxiliary line dark intersecting point;

determining, based on the gray data and the dark area data, an output color signal corresponding to the gray-dark auxiliary line gray intersecting point and an output color signal corresponding to the gray-dark auxiliary line dark intersecting point;

determining, for the each second grid point, a light interpolation coefficient that reflects characteristic of the light area data; and determining, for the each second grid point, a second grid point correspondence relationship between an input color signal and an output color signal by performing interpolation between the output color signals corresponding to the gray-dark auxiliary line gray intersecting point and the gray-dark auxiliary line dark intersecting point by using the light interpolation coefficient; and creating a color conversion table indicating the first grid point correspondence relationships for the first grid points and the second grid point correspondence relationships for the second grid points.

12. A method for creating a color conversion table indicating correspondence relationships for grid points between input color signals representing values in an input color space defined in an input-side device and output color signals representing values in an output color space defined in an output-side device, a color gamut, primary colors, a gray line, light lines, and dark lines, and the grid points being defined in the input color space, the gray line connecting white and black, one light line being defined for each primary color as a line connecting white and the subject primary color, one dark line being defined for each primary color as a line connecting black and the subject primary color, the color gamut including primary color gamuts, one primary color gamut being defined for each primary color by the gray line, the light line corresponding to the subject primary color, and the dark line corresponding to the subject primary color, the grid points having first grid points and second grid points different from the first grid points, the first grid points and the second grid points being positioned in the primary color gamuts, the first grids point being positioned on at least one of the gray line, light lines, and dark lines, the method comprising:

creating, with a color conversion table creating device, gray data representing a correspondence relationship between input color signals and output color signals for prescribed points that are positioned on the gray line;

creating, for each primary color, light area data representing a correspondence relationship between input color signals and output color signals for prescribed points that are positioned on the light line;

creating, for each primary color, dark area data representing a correspondence relationship between input color signals and output color signals for prescribed points that are positioned on the dark line;

(a) determining, for each first grid point, first grid point correspondence relationship between an input color signal and an output color signal, based on the gray data, the light area data, and the dark area data;

(b) determining, for each second grid point, a second grid point correspondence relationship between an input color signal and an output color signal, the (b) determining step including:

setting, in a primary color gamut in which the each second grid point is positioned, a light-dark auxiliary line passing through the each second grid point and intersecting with both the light line and the dark line;

setting a point at intersection of the light-dark auxiliary line with the light line as a light-dark auxiliary line light intersecting point;

setting a point at intersection of the light-dark auxiliary line with the dark line as a light-dark auxiliary line dark intersecting point;

determining, based on the light data and the dark area data, an output color signal corresponding to the light-dark auxiliary line light intersecting point and an output color signal corresponding to the light-dark auxiliary line dark intersecting point;

determining, for the each second grid point, a gray interpolation coefficient that reflects characteristic of the gray data; and determining, for the each second grid point, a second grid point correspondence relationship between an input color signal and an output color signal by performing interpolation between the output color signals corresponding to the light-dark auxiliary line light intersecting point and the light-dark auxiliary line dark intersecting point by using the gray interpolation coefficient; and creating a color conversion table indicating the first grid point correspondence relationships for the first grid points and the second grid point correspondence relationships for the second grid points.

13. A non-transitory computer-readable recording medium that stores a color conversion table creating program for creating a color conversion table indicating correspondence relationships for grid points between input color signals representing values in an input color space defined in an input-side device and output color signals representing values in an output color space defined in an output-side device, a color gamut, primary colors, a gray line, light lines, and dark lines, and the grid points being defined in the input color space, the gray line connecting white and black, one light line being defined for each primary color as a line connecting white and the subject primary color, one dark line being defined for each primary color as a line connecting black and the subject primary color, the color gamut including primary color gamuts, one primary color gamut being defined for each primary color by the gray line, the light line corresponding to the subject primary color, and the dark line corresponding to the subject primary color, the grid points having first grid points and second grid points different from the first grid points, the first grid points and the second grid points being positioned in the primary color gamuts, the first grid points being positioned on at least one of the gray line, light lines, and dark lines, the color conversion table creating program comprising instructions for: creating, with a color conversion table creating device, gray data representing a correspondence relationship between input color signals and output color signals for prescribed points that are positioned on the gray line; creating, for each primary color, light area data representing a correspondence relationship between input color signals and output color signals for prescribed points that are positioned on the light line; creating, for each primary color, dark area data representing a correspondence relationship between input color signals and output color signals for prescribed points that are positioned on the dark line; (a) determining, for each first grid point, first grid point correspondence relationship between an input color signal and an output color signal, based on the gray data, the light area data, and the dark area data; (b) determining, for each second grid point, a second grid point correspondence relationship between an input color signal and an output color signal, the (b) determining step including: setting, in a primary color gamut in which the each second grid point is positioned, a gray-dark auxiliary line passing through the each second grid point and intersecting with both the gray line and the dark line; setting a point at intersection of the gray-dark auxiliary line with the gray line as a gray-dark auxiliary line gray intersecting point; setting a point at intersection of the gray-dark auxiliary line with the dark line as a gray-dark auxiliary line dark intersecting point; determining, based on the gray data and the dark area data, an output color signal corresponding to the gray-dark auxiliary line gray intersecting point and an output color signal corresponding to the gray-dark auxiliary line dark intersecting point; determining, for the each second grid point, a light interpolation coefficient that reflects characteristic of the light area data; and determining, for the each second grid point, a second grid point correspondence relationship between an input color signal and an output color signal by performing interpolation between the output color signals corresponding to the gray-dark auxiliary line gray intersecting point and the gray-dark auxiliary line dark intersecting point by using the light interpolation coefficient; and creating a color conversion table indicating the first grid point correspondence relationships for the first grid points and the second grid point correspondence relationships for the second grid points.

14. A non-transitory computer-readable recording medium that stores a color conversion table creating program for creating a color conversion table indicating correspondence relationships for grid points between input color signals representing values in an input color space defined in an input-side device and output color signals representing values in an output color space defined in an output-side device, a color gamut, primary colors, a gray line, light lines, and dark lines, and the grid points being defined in the input color space, the gray line connecting white and black, one light line being defined for each primary color as a line connecting white and the subject primary color, one dark line being defined for each primary color as a line connecting black and the subject primary color, the color gamut including primary color gamuts, one primary color gamut being defined for each primary color by the gray line, the light line corresponding to the subject primary color, and the dark line corresponding to the subject primary color, the grid points having first grid points and second grid points different from the first grid points, the first grid points and the second grid points being positioned in the primary color gamuts, the first grid points being positioned on at least one of the gray line, light lines, and dark lines, the color conversion table creating program comprising instructions for: creating, with a color conversion table creating device, gray data representing a correspondence relationship between input color signals and output color signals for prescribed points that are positioned on the gray line; creating, for each primary color, light area data representing a correspondence relationship between input color signals and output color signals for prescribed points that are positioned on the light line; creating, for each primary color, dark area data representing a correspondence relationship between input color signals and output color signals for prescribed points that are positioned on the dark line; (a) determining, for each first grid point, first grid point correspondence relationship between an input color signal and an output color signal, based on the gray data, the light area data, and the dark area data; (b) determining, for each second grid point, a second grid point correspondence relationship between an input color signal and an output color signal, the (b) determining step including: setting, in a primary color gamut in which the each second grid point is positioned, a light-dark auxiliary line passing through the each second grid point and intersecting with both the light line and the dark line; setting a point at intersection of the light-dark auxiliary line with the light line as a light-dark auxiliary line light intersecting point; setting a point at intersection of the light-dark auxiliary line with the dark line as a light-dark auxiliary line dark intersecting point; determining, based on the light data and the dark area data, an output color signal corresponding to the light-dark auxiliary line light intersecting point and an output color signal corresponding to the light-dark auxiliary line dark intersecting point; determining, for the each second grid point, a gray interpolation coefficient that reflects characteristic of the gray data; and determining, for the each second grid point, a second grid point correspondence relationship between an input color signal and an output color signal by performing interpolation between the output color signals corresponding to the light-dark auxiliary line light intersecting point and the light-dark auxiliary line dark intersecting point by using the gray interpolation coefficient; and creating a color conversion table indicating the first grid point correspondence relationships for the first grid points and the second grid point correspondence relationships for the second grid points.

* * * * *